US006428031B1

(12) United States Patent
McCoy et al.

(10) Patent No.: US 6,428,031 B1
(45) Date of Patent: Aug. 6, 2002

(54) TRAILER HITCH ASSEMBLY WITH MULTIPLE RECEIVERS

(75) Inventors: Richard W. McCoy, Granger; Thomas W. Lindenman, South Bend, both of IN (US)

(73) Assignee: Reese Products, Inc., Elkhart, IN (US)

( * ) Notice: Subject to any disclaimer, the term of this patent is extended or adjusted under 35 U.S.C. 154(b) by 0 days.

(21) Appl. No.: 09/698,742

(22) Filed: Oct. 27, 2000

Related U.S. Application Data

(60) Provisional application No. 60/162,052, filed on Oct. 28, 1999.

(51) Int. Cl.[7] ................................................ B60D 13/00

(52) U.S. Cl. .................... 280/495; 280/415.1; 280/504; 224/519

(58) Field of Search .............................. 280/495, 415.1, 280/416.1, 460.1, 500, 504, 505; 293/117; D12/162; 224/484, 489, 512, 519

(56) References Cited

U.S. PATENT DOCUMENTS 2,468,579 A 4/1949 Vuori
2,672,265 A 3/1954 Milstead
4,159,833 A 7/1979 Meiners
4,204,702 A 5/1980 Oltrogge
4,326,730 A 4/1982 Tomen
4,915,276 A 4/1990 Devito
4,950,010 A 8/1990 Denny
5,094,469 A * 3/1992 Yamamoto et al. ......... 280/500
5,149,122 A * 9/1992 Helber ....................... 280/495
5,215,234 A 6/1993 Pasley
5,476,279 A 12/1995 Klemetsen
5,497,927 A 3/1996 Peterson
5,560,631 A * 10/1996 Salvo ......................... 280/507
5,620,198 A 4/1997 Borchers
5,628,536 A * 5/1997 Fulkerson ................... 280/507
5,699,985 A 12/1997 Vogel
6,125,945 A * 10/2000 Skaggs et al. ........... 280/491.5
6,139,044 A * 10/2000 Smith et al. ................ 280/500
D433,357 S * 11/2000 McCoy et al. ............. D12/162
D434,354 S * 11/2000 McCoy et al. ............. D12/162
D445,738 S * 7/2001 Lindenman et al. ....... D12/162

FOREIGN PATENT DOCUMENTS

EP 123712 * 11/1984 .............. 280/460.1

* cited by examiner

*Primary Examiner*—Daniel G. DePumpo
(74) *Attorney, Agent, or Firm*—King & Schickli, PLLC

(57) ABSTRACT

A trailer hitch assembly includes a cross member, a pair of mounting brackets carried on the cross member, a first receiver box carried on the cross member and extending in a substantially horizontal plane and a second receiver box carried on the cross member and extending upwardly at an angle between 10–30° with respect to the horizontal plane.

12 Claims, 8 Drawing Sheets

25 18 24 22 14 10 25 30 24 20 12 22 30 40 36 28 34 32 26 40 16 38

10
12
14
16
18
20
22
24
25
26
28
30
32
34
36
38
40

10
12
14
16
18
20
22
26
28
30
30
32
34
36
38

42
56
48
46
44
56
REESE 56
50
54
52
42
46
44
52
56
54
50

44
54
42
50
52

25
20
16
50
54
44
42

TRAILER HITCH ASSEMBLY WITH MULTIPLE RECEIVERS

This application claims the benefit of U.S. Provisional Application No. 60/162,052, filed Oct. 28, 1999.

TECHNICAL FIELD

The present invention relates generally to the trailer towing field and, more particularly, to a trailer hitch assembly including multiple receiver boxes for mounting a trailer and/or multiple towing accessories such as article carriers, bike racks, ski racks, winches or the like and a shroud therefore to provide a more aesthetically pleasing appearance.

BACKGROUND OF THE INVENTION

It is long been known to construct towing hitch assemblies that are mounted to vehicles in order to allow the towing of trailers or the like. In recent years such hitch assemblies have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 3565 as manufactured by Reese Products, Inc. of Elkhart, Ind. Such a hitch receiver is also disclosed in, for example, U.S. Pat. No. 5,620,198, owned by Reese Products, Inc., the assignee of the present invention.

In addition to allowing the towing of trailers, a receiver box may be utilized to secure various accessories to the towing vehicle. Such accessories include, but are not limited to, various article carriers such as the bike carrier disclosed in U.S. Pat. No. 5,695,103 to Duvernay et al. and a snowboard adaptor for bicycle racks such as described in pending U.S. patent application Ser. No. 29/095,817 filed on Oct. 30, 1998. These accessories are received in the cavity of the receiver box of a trailer hitch assembly in the same manner a hitch bar is received therein for towing a trailer.

Of course, a trailer hitch assembly incorporating a single receiver box may either be used to tow a trailer or to hold a hitch accessory, not both. A more convenient and useful trailer hitch assembly would allow simultaneous use for both the towing of a trailer and the carrying of accessories. The present invention achieves this end by providing a trailer hitch assembly incorporating multiple receiver boxes that may be connected to a hitch bar for towing a trailer and/or one or more additional trailer hitch accessories.

SUMMARY OF THE INVENTION

In accordance with the purposes of the present invention as described herein, a trailer hitch assembly is provided incorporating a cross member, a pair of mounting brackets carried on the cross member and at least two and more commonly three hitch receivers carried on the trailer hitch assembly.

More specifically, the cross member includes a first end secured to a first of a pair of mounting brackets and a second end secured to a second of the pair of mounting brackets. Further, the at least two hitch receivers include a first receiver box mounted at a mid line or center line along the cross member and a second receiver box mounted to the cross member a spaced distance to a first side of the cross member from the first receiver box. Consistent with this description the trailer hitch assembly may also include a third receiver box mounted to the cross member a spaced distance to a second side of the cross member from the first receiver box.

In one particular embodiment, the first receiver box extends from the cross member in a substantially horizontal plane. The first receiver box is thereby particularly suited to receive a hitch bar and associated ball for towing a trailer. The second and third hitch boxes extend in a second plane projecting upwardly from the cross member at about a 10–30° and more specifically, an approximately 20° angle with respect to the horizontal.

At this upward inclination, gravity functions to further seat and secure any accessory in the second and third receiver boxes.

The invention may also include a chain plate and an anchor plate for securely interconnecting the first receiver box to the cross member. Still further, the invention may include a decorative shroud which may be removably mounted to the trailer hitch assembly to provide a more aesthetically pleasing appearance. In this way, the trailer hitch assembly is made less noticeable and is thereby more effectively and efficiently integrated into the overall lines and styling features of the towing vehicle to which the trailer hitch assembly is mounted.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
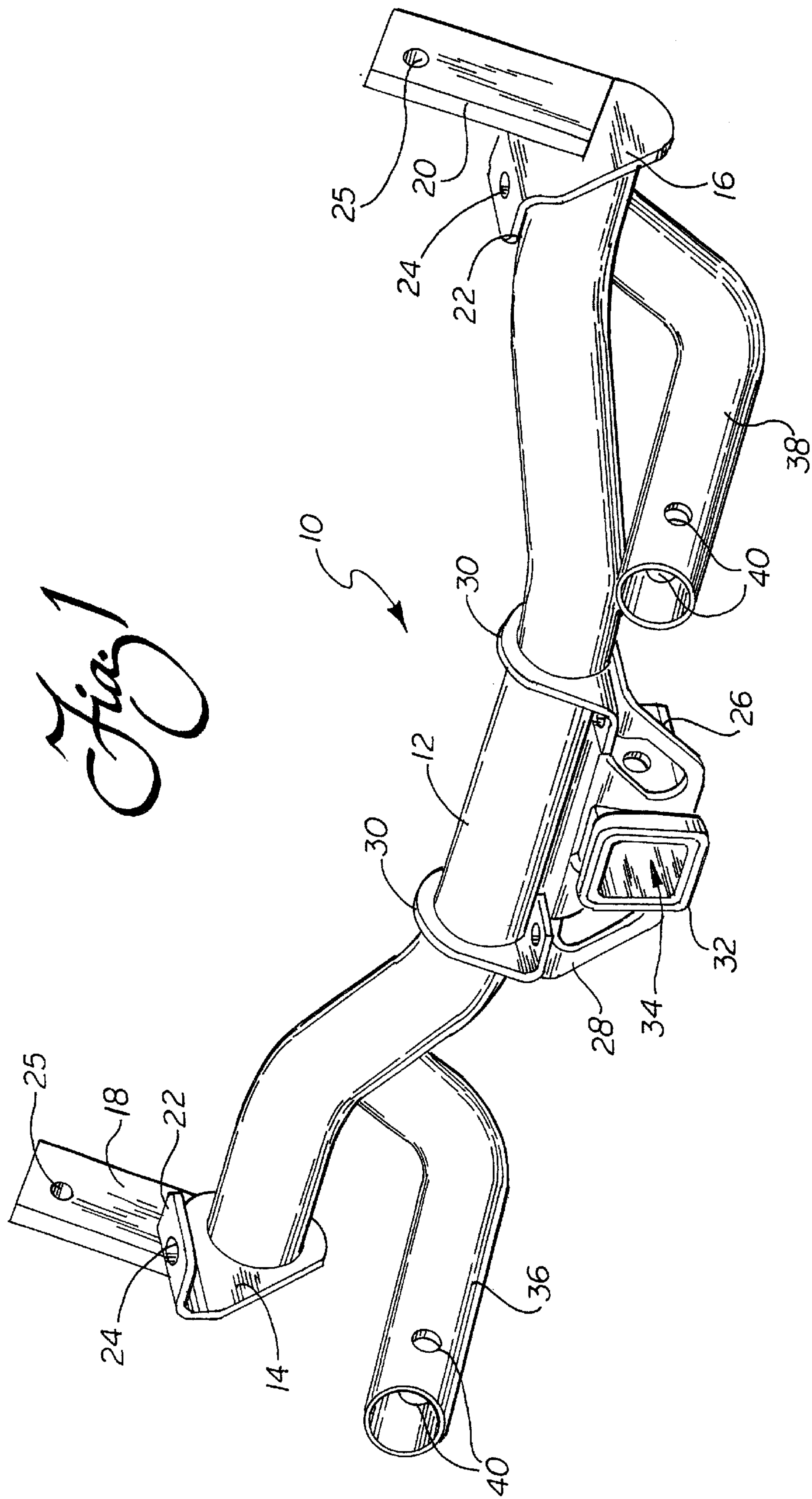
FIG. 1 is a perspective view of the trailer hitch assembly of the present invention.

Reference is now made to FIG. 1 showing a trailer hitch assembly 10 of the present invention. The trailer hitch assembly 10 includes a central frame or cross member 12 preferably formed from tubular steel material. The cross member 12 may be straight, curved, such as in the substantially bow shape illustrated, or assume some other appropriate configuration. A pair of vehicle mounting brackets 14, 16 may be secured to the ends of the cross member 12. Each vehicle mounting bracket 14, 16 may also include a bracket extension 18, 20. The cross member 12, mounting brackets 14, 16 and bracket extensions 18, 20 may be secured together by welding or other appropriate means suitable for this purpose and known to those skilled in the art.

Each of the vehicle mounting brackets 14, 16 includes a depending mounting skirt 22 having one or more apertures 24. Similarly, each of the bracket extensions 18, 20 includes an aperture 25. The trailer hitch assembly 10 is mounted to the frame of a vehicle by aligning the apertures 24 in the mounting skirts 22 of the vehicle mounting brackets 14, 16 and the apertures 25 in the bracket extensions 18, 20 with cooperating apertures drilled in the frame of the vehicle. Appropriate fasteners such as cooperating nuts and bolts secured with lock washers (not shown) complete the connection in a manner well known in the art.

A first receiver box 26 is mounted at the center line or mid line of the cross member 12. The receiver box 26 is welded to the cross member 12 with an underlying chain plate 28 and a pair of overlying anchor brackets 30 providing additional strength and support. As further shown in FIG. 1, the receiver box 26 includes a reinforced lip 32 defining an opening leading to a hitch bar receiving cavity 34. In use, the first receiver box 26 extends in a substantially horizontal plane from the cross member 12 so as to be adapted to receive a hitch bar which carries a ball for towing a trailer.

Figure 2:
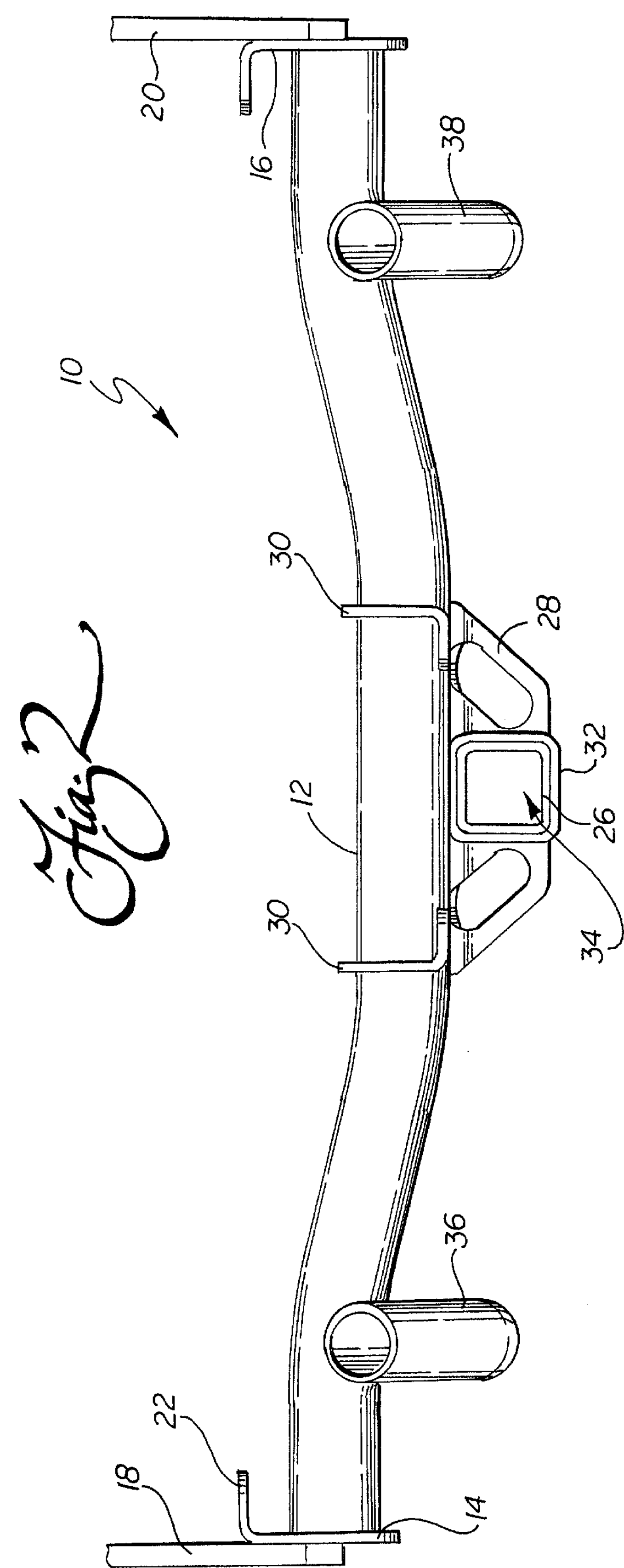
FIG. 2 is a front elevational view of the trailer hitch assembly.

As further shown in FIGS. 1 and 2, a second receiver box 36 is mounted to the cross member 12 at a spaced distance to a first side of the cross member from the first receiver box 26. The second receiver box 36 like the first receiver box 26 may be welded to the cross member 12.

The trailer hitch assembly 10 may also include a third receiver box 38 mounted to the cross member 12 a spaced distance to a second side of the cross member from the first receiver box 26. The third receiver box 38 may also be welded to the cross member 12 to provide a secure and strong connection.

The spacing of the second receiver box 36 from the first receiver box 26 and the spacing of the third receiver box 38 from the first receiver box is usually identical but for certain applications it may differ. Both of the second and third receiver boxes 36, 38 may be formed from tubular steel and may be square like the receiver box 26, round as illustrated or even assume some other desired shape allowing connection to any appropriate accessory such as a cargo carrier, ski rack, winch, etc.

In the embodiment illustrated in the drawing FIGS. 1 and 2, when mounted to a towing vehicle each receiver box 36, 38 extends upwardly at an angle of between 10–30° and more specifically at approximately 20° from the horizontal. This upward inclination insures a secure connection between the receiver boxes 36, 38 and any accessory that might be attached thereto. Specifically, the upward angle insures that gravity works with the operator to properly seat the accessory and complete the connection. The angular orientation also insures that the lower lip of each receiver box 36, 38 projects outwardly beyond the upper lip so that it may act as a shelf or shoulder to support the accessory when it is initially aligned with the receiver box. The cooperating arcuate walls of the receiver box and the accessory mounting bar or post serve to promote proper alignment and connection while the lower lip supports the weight of the accessory. Accordingly, accessory connection is convenient and easy.

Of course, each receiver box 36, 38 includes aligned, opposed apertures 40 in the wall thereof. The apertures 40 are capable of receiving a cooperating connecting pin (note, for example, the pins 54 discussed below) also received in aligned cooperating apertures in the mounting post of the accessory. This arrangement provides a completely secure connection with any accessory mounted in the receiver boxes.

Figure 3:
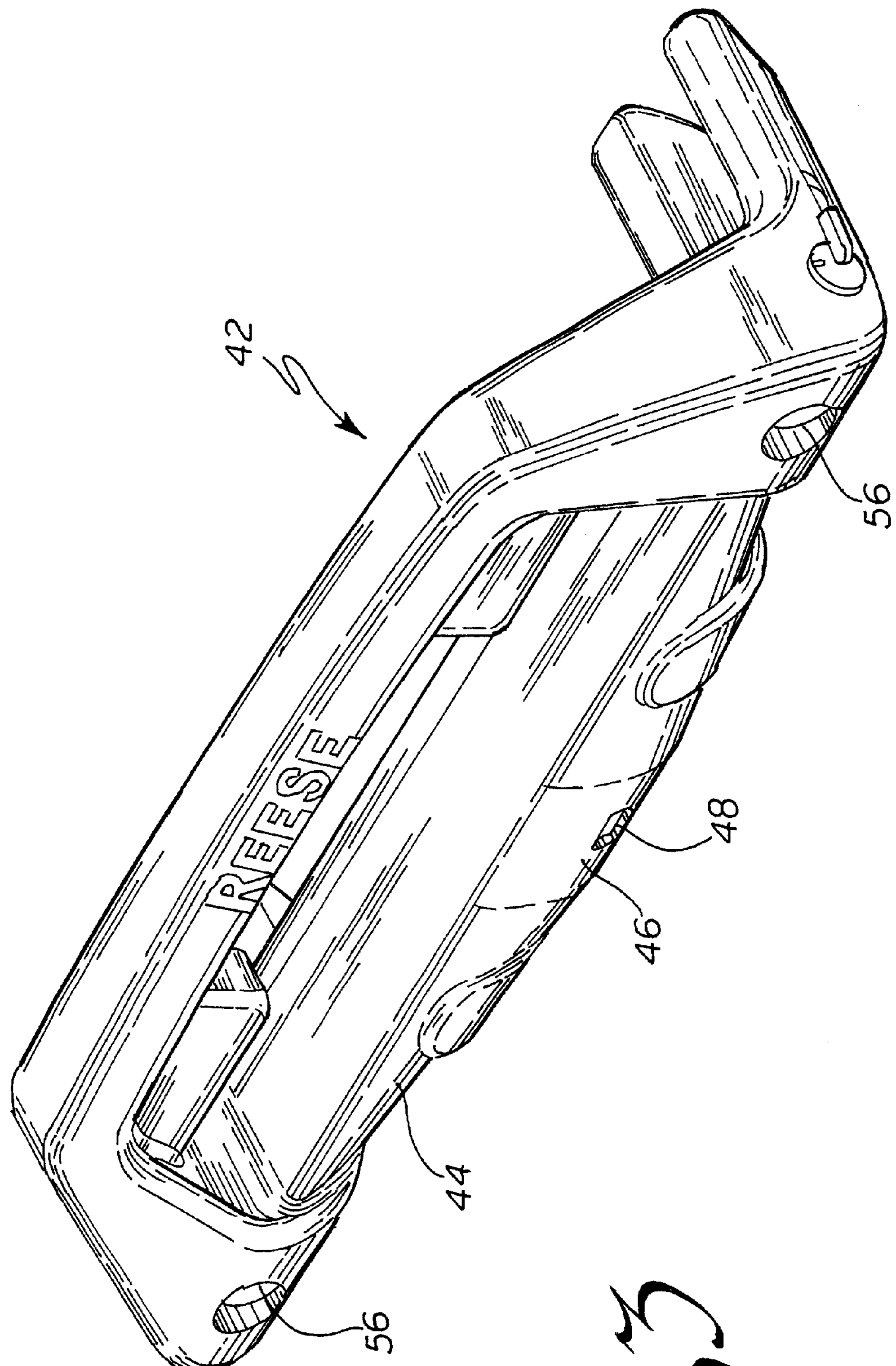
FIG. 3 is a perspective view of the shroud for the trailer hitch assembly shown in FIGS. 1 and 2.
Figure 4:
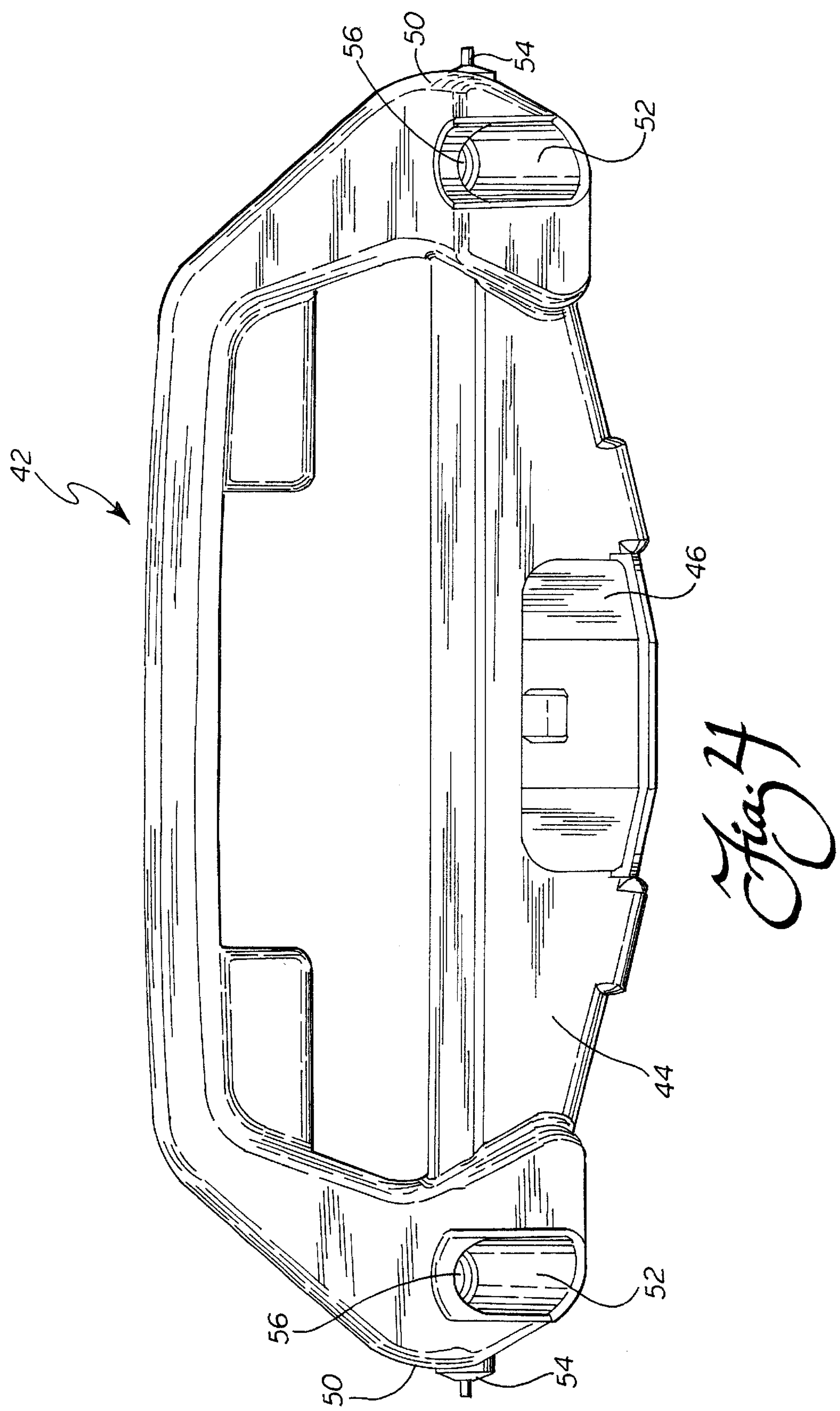
FIG. 4 is a rear elevational view of the shroud shown in FIG. 3.
Figure 5:
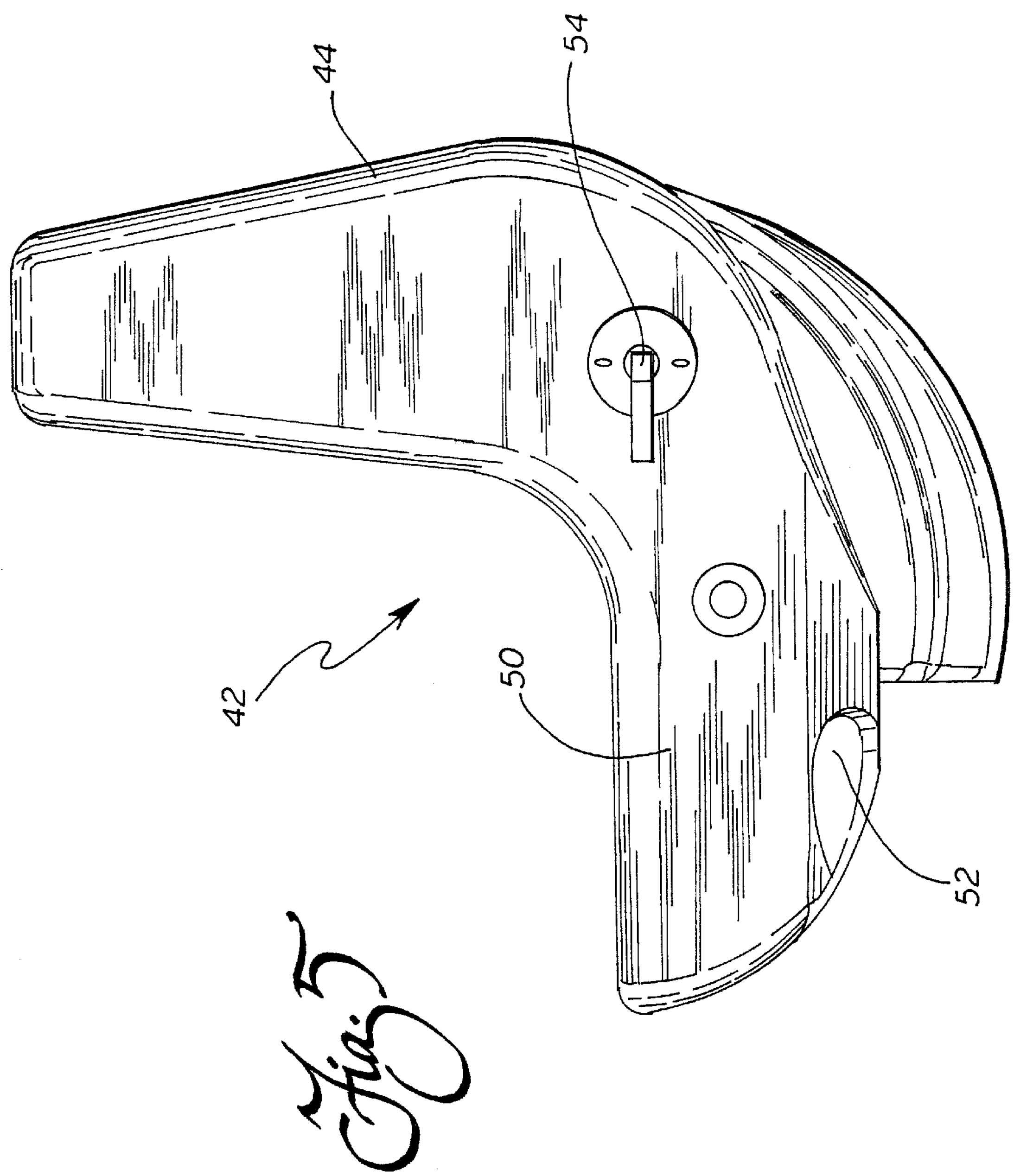
FIG. 5 is a right end elevational view of the shroud illustrated in FIGS. 3 and 4.
Figure 6:
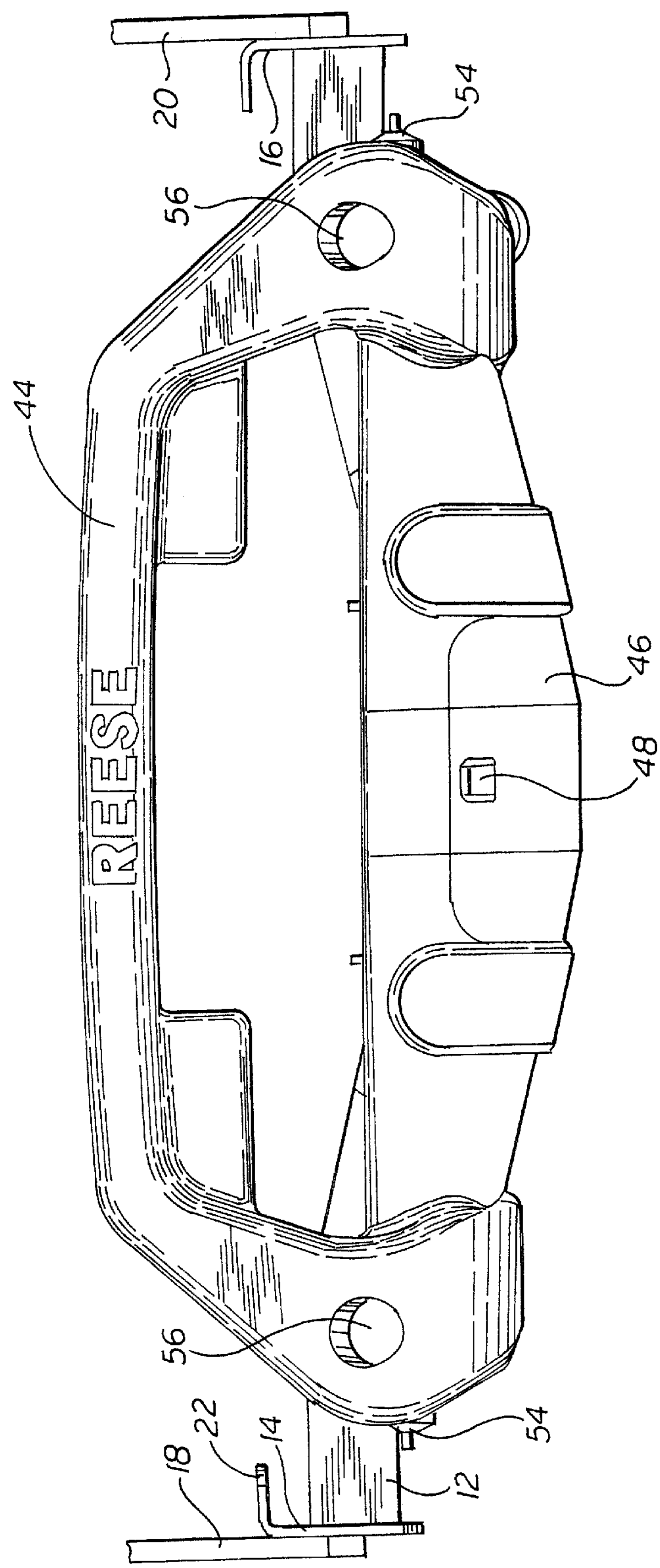
FIG. 6 is a front elevational view similar to FIG. 2 but showing the shroud mounted on the trailer hitch assembly.
Figure 7:
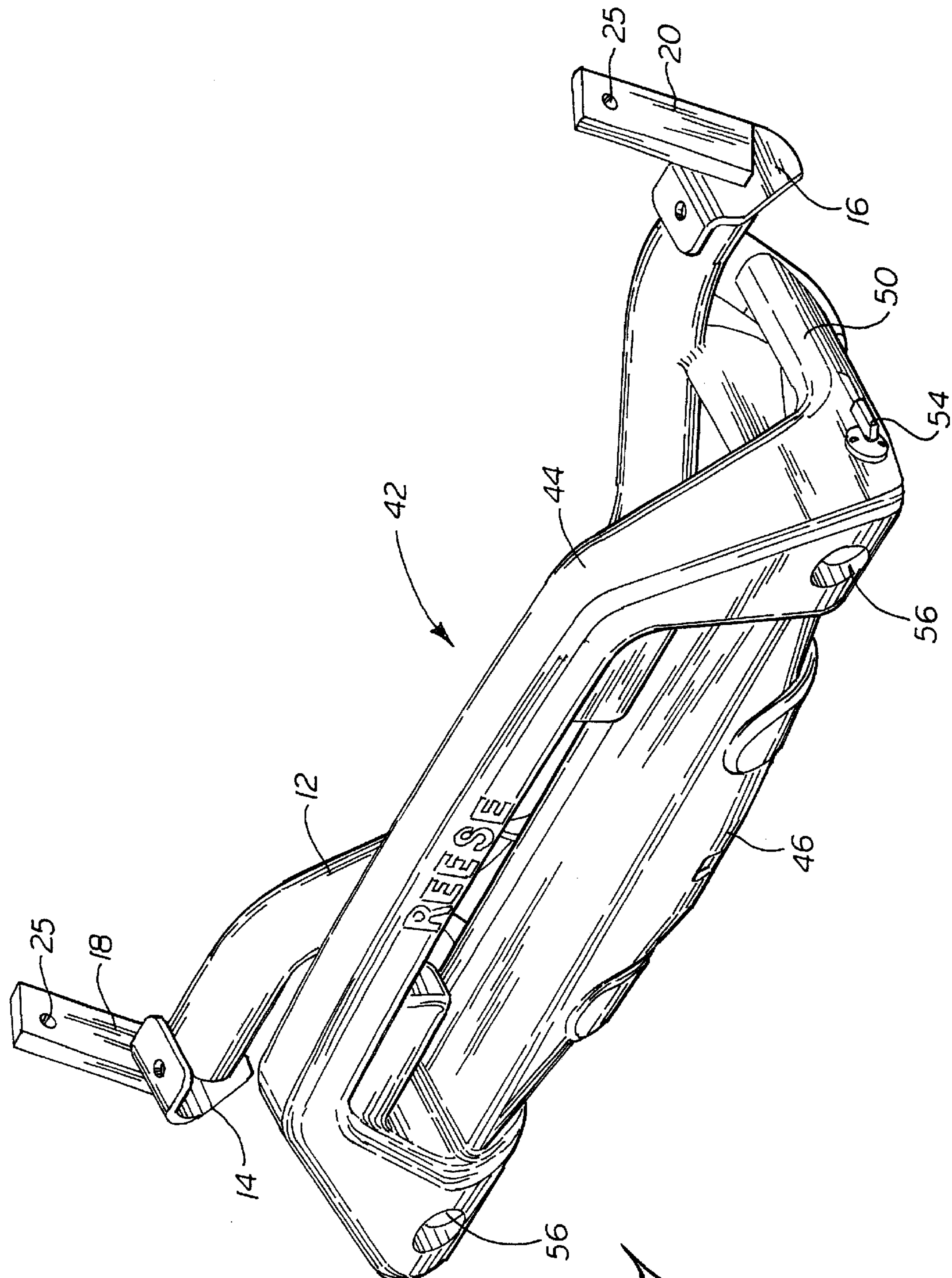
FIG. 7 is a perspective view showing the shroud mounted on the trailer hitch assembly.
Figure 8:
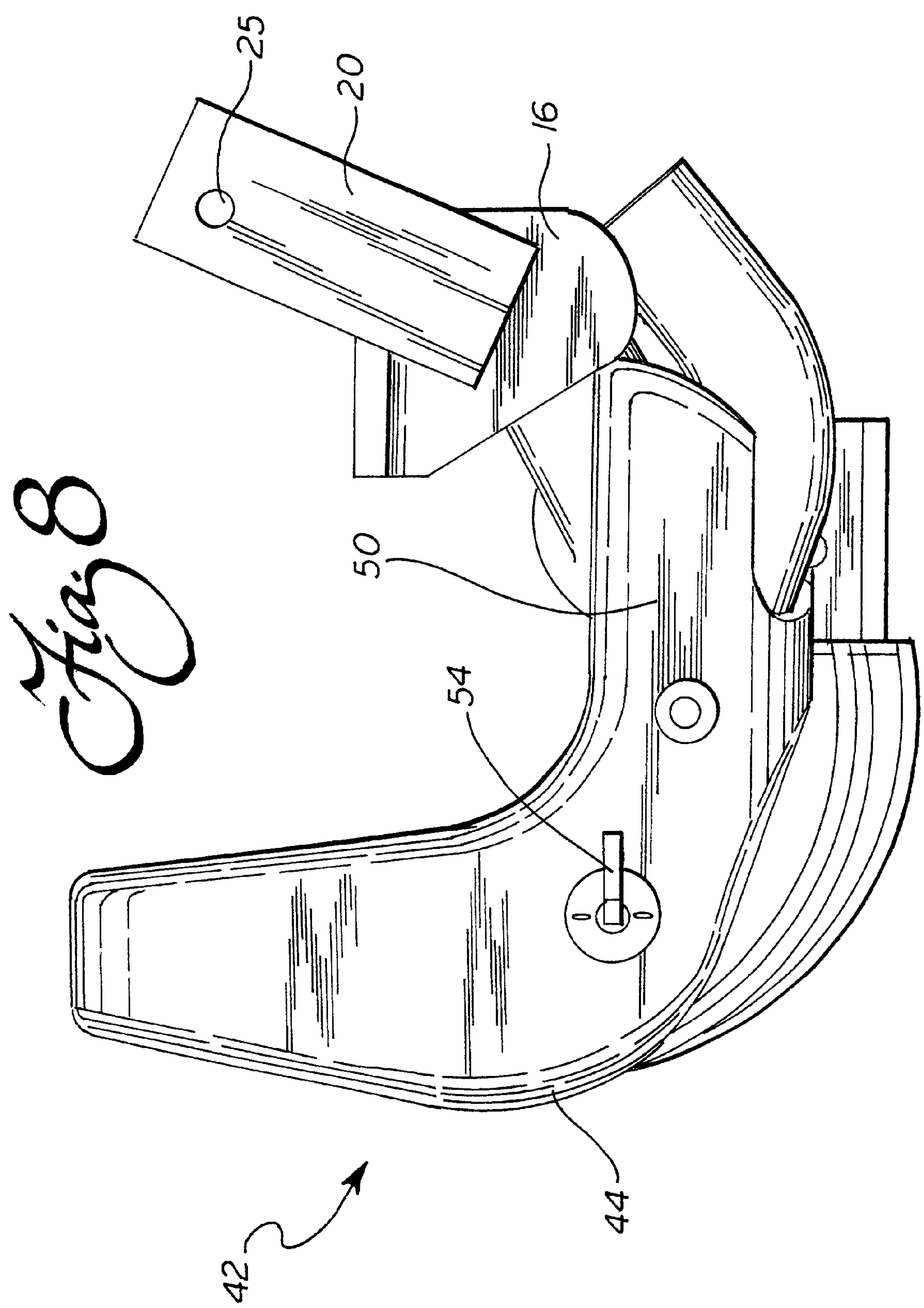
FIG. 8 is a left end elevational view showing the shroud mounted on the trailer hitch assembly.

With reference to FIGS. 3–5, the trailer hitch assembly 10 may also include a shroud, generally designated by reference numeral 42. As shown, the shroud 42 includes a body 44 with a decorative front face and an access door or panel 46 which may be opened in order to gain access to the first hitch receiver 26 when the shroud 42 is carried over the trailer hitch assembly (see also FIGS. 6–8). The access door 46 may be hinged and include a latch (not shown) to secure it in the closed position. A lever 48 may be provided to release the latch and open the access door 46.

As best shown in FIGS. 3–5, the shroud 42 includes a pair of mounting wings 50, one wing being provided adjacent each end. Each mounting wing 50 includes an integral sleeve 52 adapted for receipt over one of the second and third receiver boxes 36, 38 (see also FIGS. 6–8). Accordingly, it should be appreciated that the shroud 42 is carried on the trailer hitch assembly 10 by engagement of the wings 50 and more particularly the sleeves 52 on the receiver boxes 36, 38. Of course, the upward inclination of the receiver boxes 36, 38 promote a secure connection. A locking pin 54 is provided in each wing 50. The locking pin 54 may be inserted through a cooperating aperture in each wing 50 to engage the aligned aperture 40 in the associated second or third receiver box 36, 38 in order to positively secure the shroud 42 in position on the trailer hitch assembly 10.

As also shown in drawing FIGS. 3–8, the shroud 42 includes two openings 56 that align with the receiver boxes 36, 38 when the shroud is mounted on the trailer hitch assembly 10. These openings 56 allow access to the receiver boxes 36, 38 so that they may be used to engage and hold one or more accessories when the shroud 42 is in place. Specifically, the locking pins 54 are removed and the accessories are inserted in the receiver boxes 36, 38. The pins 54 are then reinserted to lock the shroud 42 and accessories (which also include pin receiving apertures) in position on the receiver boxes 36, 38.

It should be appreciated from the foregoing description that the trailer hitch assembly 10 of the present invention is a versatile performer providing the user with a multitude of towing options. For example, one or more article carriers such as a ski rack or bike rack may also be secured to the trailer hitch assembly 10 in the second and/or third receiver boxes 36, 38. This is true even when a trailer is held in the first receiver box 26. Further, if the vehicle is not presently being used to tow a trailer, the first receiver box 26 is open and, therefore, may receive another article carrier or other device adapted for mounting in a receiver box. Alternatively, the first receiver box 26 could provide a third connection point for a single accessory when a particularly stable mounting is required. Thus, it should be appreciated that the present invention provides an individual with a number of towing option heretofore unavailable with single hitch receivers of the prior art.

In summary, numerous benefits result from employing the concepts of the present invention. Specifically, the trailer hitch assembly 10 may be utilized to carry one, two or three separate towing aaccessories simultaneously or one or two towing accessories in conjunction with a towed trailer. The length of the trailer tow bar and the forwardly projecting frame of the trailer provide the necessary clearance to allow various towing accessories to be mounted in the second and third receiver boxes without interfering with the towing of the trailer.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the sleeves 52 on the shroud 42 which engage the receiver boxes 36, 38 may be either a full 360° around or partial (e.g., 280° around). The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer hitch assembly comprising:

a cross member;

a pair of mounting brackets carried on said cross member;

a first receiver box carried on said cross member and extending in a substantially horizontal plane;

a second receiver box carried on said cross member, said second receiver box projecting rearwardly from said cross member and extending upwardly from said cross member at an angle from the horizontal plane of less than 90°.

2. The trailer hitch assembly of claim 1 further including a third receiver box carried on said cross member, said third receiver box projecting rearwardly from said cross member and extending upwardly from said cross member at an angle from the horizontal plane of less than 90°.

3. The trailer hitch assembly of claim 1, wherein said angle of said second receiver box is between substantially 10° and substantially 30°.

4. The trailer hitch assembly of claim 1, wherein said angle of said second receiver box is about 20°.

5. The trailer hitch assembly of claim 1, further including a shroud having a body with a decorative face and a sleeve for engaging said second receiver box.

6. The trailer hitch assembly of claim 5, wherein said shroud further includes an access door for gaining access to said first receiver box.

7. The trailer hitch assembly of claim 5, wherein said shroud further includes a latching pin for engaging said second receiver box.

8. A trailer hitch assembly comprising:

a cross member;

a pair of mounting brackets carried on said cross member;

a first receiver box carried on said cross member and extending in a substantially horizontal plane;

a second receiver box carried on said cross member and extending upwardly at an angle of between substantially 10° to substantially 30° from the horizontal plane; and a third receiver box carried on said cross member and extending upwardly at an angle of between substantially 10° and substantially 30° from the horizontal plane.

9. A trailer hitch assembly comprising:

a cross member;

a pair of mounting brackets carried on said cross member;

a first receiver box carried on said cross member and extending in a substantially horizontal plane;

a second receiver box carried on said cross member and extending upwardly at an angle of about 20° from the horizontal plane; and a third receiver box carried on said cross member and extending upwardly at an angle of about 20° from the horizontal plane.

10. A trailer hitch assembly comprising:

a cross member;

a pair of mounting brackets carried on said cross member;

a first receiver box carried on said cross member and extending in a substantially horizontal plane;

a second receiver box carried on said cross member and extending upwardly at an angle from the horizontal plane;

a third receiver box carried on said cross member and extending upwardly at an angle from the horizontal plane; and a shroud having a body with a decorative face and a pair of sleeves for engaging said second and third receiver boxes.

11. The trailer hitch assembly of claim 10, wherein said shroud further includes an access door for gaining access to said first receiver box.

12. The trailer hitch assembly of claim 10, wherein said shroud further includes a pair of latching pins for engaging said second and third receiver boxes.

* * * * *